US009727837B1

(12) United States Patent
Campbell, Jr. et al.

(10) Patent No.: US 9,727,837 B1
(45) Date of Patent: Aug. 8, 2017

(54) SYSTEM UTILIZING LAYERED SOFTWARE APPLICATION FOR FACILITATING DELIVERY SERVICES

(71) Applicants: Carl Henry Campbell, Jr., Biloxi, MS (US); Christopher Bristol, Oxford, MS (US)

(72) Inventors: Carl Henry Campbell, Jr., Biloxi, MS (US); Christopher Bristol, Oxford, MS (US)

(*) Notice: Subject to any disclaimer, the term of this patent is extended or adjusted under 35 U.S.C. 154(b) by 637 days.

(21) Appl. No.: 13/784,301

(22) Filed: Mar. 4, 2013

Related U.S. Application Data

(60) Provisional application No. 61/771,548, filed on Mar. 1, 2013, provisional application No. 61/634,808, filed on Mar. 7, 2012, provisional application No. 61/634,523, filed on Mar. 2, 2012.

(51) Int. Cl.
G06Q 30/00 (2012.01)
G06Q 10/08 (2012.01)
G06Q 30/06 (2012.01)

(52) U.S. Cl.
CPC ....... *G06Q 10/0835* (2013.01); *G06Q 10/087* (2013.01); *G06Q 10/0832* (2013.01); *G06Q 30/0603* (2013.01); *G06Q 30/0619* (2013.01)

(58) Field of Classification Search
CPC ............. G06Q 10/08–10/0875; G06Q 30/0601–30/0643; G06Q 30/08; G06Q 30/06; G06Q 10/083; G06Q 10/08355; G06Q 10/087; G06F 17/30; G06F 17/40
See application file for complete search history.

(56) References Cited

U.S. PATENT DOCUMENTS

| 5,960,411 A | 9/1999 | Hartman et al. | |
|---|---|---|---|
| 7,844,481 B2 | 11/2010 | Hillbush et al. | |
| 2002/0152128 A1 | 10/2002 | Walch et al. | |
| 2002/0184104 A1* | 12/2002 | Littman | G06Q 30/06 705/26.8 |
| 2003/0046173 A1 | 3/2003 | Benjier et al. | |
| 2004/0030572 A1 | 2/2004 | Campbell et al. | |
| 2007/0219875 A1* | 9/2007 | Toulotte | G06Q 10/109 705/26.7 |
| 2007/0250398 A1* | 10/2007 | Chowdhary | G06Q 10/083 705/26.62 |
| 2009/0276270 A1* | 11/2009 | Karnataka | G06Q 10/00 707/796 |
| 2012/0150973 A1* | 6/2012 | Barak | G06Q 30/0609 709/206 |
| 2014/0310048 A1* | 10/2014 | Murray | G06Q 10/087 705/7.22 |

OTHER PUBLICATIONS

"An architecture for a business and information system". B. A. Devlin. P.T. Murphy. IBM System Journal, Vo. 27, No. 1. 1988.*

* cited by examiner

*Primary Examiner* — William Allen
(74) *Attorney, Agent, or Firm* — Jeremy A. Smith; Bradley Arant Boult Cummings LLP

(57) ABSTRACT

A Barcode to Zipcode Application, the purpose of which is to remove as many steps from the supply chain as possible, reducing the time required to complete the process of purchasing goods in one location for delivery in another location to hours or even minutes. This application contains interfaces to location based retail product information services as well as customer payment processing systems. The application functions as an internet web application with the primary users being the customer service representatives and delivery personnel.

9 Claims, 26 Drawing Sheets

Component Diagram

Use Case UC2: Delivery Fulfillment

Component Diagram

Order and Delivery

In-Store Kiosk or mini-store

Main Menu

This is the primary entry point of the application. From this point the user can navigate to any of the five primary functional sections of the application.

Register Sender Search Screen

Barcode - to - Zipcode
Register Sender

Name: [Smith]   [Search]  [New]  [Back]

| Name | First | Phone |
|---|---|---|
| Smith | Jayne | (3)331-4094 |
| Smithberger | Belkis | (822)906-890 |
| Smithe | Tressie | (843)35-9809 |
| Smithee | Joleen | (363)330-9979 |
| Smithen | Van | (994)740-7489 |
| Smither | Rosaria | (106)172-9443 |
| Smitherman | Exilie | (649)368-4093 |
| Smithers | Hester | (121)898-7995 |
| Smithey | Maddie | (232)938-1075 |
| Smithhart | Rolf | (85)891-9434 |
| Smithheart | Galen | (228)359-1071 |
| Smithhisler | Bernardo | (643)431-9013 |
| Smithkingell | Christena | (181)954-3336 |
| Smithy | Latrice | (280)738-7293 |

This is the screen that allows a search for existing customers. If an existing customer cannot be found, it can be added by selecting the New Button.

FIG. 14

Register Sender Detail Screen

```
Barcode - to - Zipcode
Register Sender - New

Name Last: Smith
        Name First: Jayme
     Phone Number: (8)381-4084
             eMail: (2)846@228541.com
    Address Line 1: Keiser lake rd
    Address Line 2:
              City: Green
             State: AK
               Zip: 10890

[ Back ] [ Submit ] [ Select ] [ Delete ]
```

If a customer is located the demographics can be displayed. If it cannot be located, a new customer record can be added to the database.

FIG. 15

Register Receiver Search Screen

This is the screen that allows a search for existing customers. If an existing customer cannot be found, it can be added by selecting the New Button.

FIG. 16

Register Receiver Detail Screen

Barcode - to - Zipcode
Register Receiver - New

Name Last: Verne
Name First: Jules
Phone Number: (223)555-1212
eMail: Jules@verne.com
Address Line 1: 101 main St
Address Line 2:
City: Denver
State: CO
Zip: 80202

[ Back ] [ Submit ] [ Select ] [ Delete ]

If a customer is located the demographics can be displayed. If it cannot be located, a new customer record can be added to the database.

FIG. 17

Main Menu After Sender and Receiver are Selected

After the Sender and the Receiver have been identified, their information can be seen on the Main Menu.

Product Search Screen using Barcode and Zipcode

This screen allows the user to search for products identified by the barcode at the location identified by the zipcode

FIG. 19

Product Detail Screen

When a product is found, its details can be displayed and a quantity to order can be entered.

Main Menu Following Product Selection

After the product(s) has been selected, an order summary is visible on the Main Menu

Check Out Screen

During the check out process, the items in the order are displayed. Items can be removed from the shopping cart at this time, Check Out / Payment Method Screen

Barcode - to - Zipcode
Payment Method

Credit Card Name Last: Smith
Credit Card Name First: Jayme

Credit Card Type: VS
Credit Card Number: 270332577
Credit Card Expiration MM: 3
Credit Card Expiration YY: 5
Credit Card Security Code: 358

Back  Submit

The Payment Method Screen allows credit card information to be collected

FIG. 23

Final Order Confirmation Screen

After the credit card has been processed, an order confirmation screen is displayed Order Summary List

Barcode - to - Zipcode
Order Summary List

Back

Order fulfillment begins with a list of orders in the "new" status.

FIG. 25

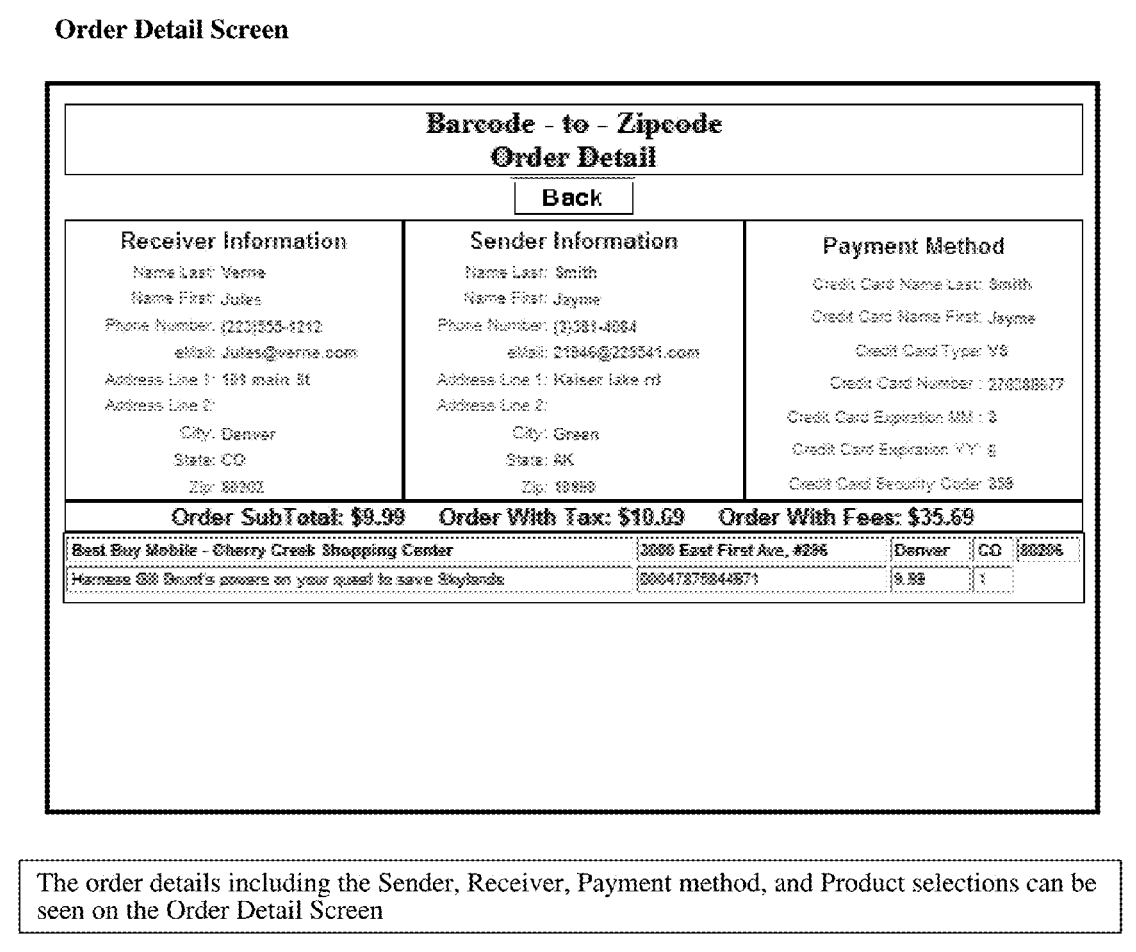

Order Detail Screen

The order details including the Sender, Receiver, Payment method, and Product selections can be seen on the Order Detail Screen

FIG. 26

SYSTEM UTILIZING LAYERED SOFTWARE APPLICATION FOR FACILITATING DELIVERY SERVICES

CROSS-REFERENCE TO RELATED APPLICATIONS

This is a non-provisional application of: U.S. Provisional Application Ser. No. 61/771,548, filed 1 Mar. 2013; U.S. Provisional Application Ser. No. 61/634,808, filed 7 Mar. 2012; and U.S. Provisional Patent Application Ser. No. 61/634,523, filed 2 Mar. 2012. Priority of these applications is hereby claimed and they are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a more efficient process of purchasing goods in one location for delivery in another location. More particularly, the present invention relates to a barcode to zipcode shopping application.

2. General Background of the Invention

The process of purchasing an item and having that item shipped and delivered to another location, whether locally or nationwide, often involves many steps including purchase, packaging, shipping, and delivery. The entire process can take days or even weeks, depending on product availability.

The following patent documents were noted as being related: U.S. Pat. Nos. 5,960,411; 7,844,481; U.S. Publication Nos. 2002/0152128; 2003/0046173; and 2004/0030572.

In U.S. Publication No. 2003/0046173 a method and system are disclosed for using the stock of one physical store, selected from among many physical stores, for the purpose of making a same-day delivery of a product purchased through a virtual store. The appropriate physical store is selected based upon proximity to the customer and availability of the desired product as indicated by the computerized inventory maintained by the store. Once the store is selected and the customer selects local delivery, the order is sent to the store and a delivery request is sent to a local delivery service that services the store. Upon receipt of the order, delivery tags are printed at the store. An employee of the store pulls the desired products from the store's inventory and tags the products for delivery. The results of the employee's efforts are input into to the system of the invention. If the products are successfully retrieved, then shipping details are received from the shipping service and communicated to the customer. The shipping service then picks up the products and completes the delivery. If the employee is unsuccessful in retrieving the products, this result is used to alter the store's computerized inventory, and, if possible, another store is selected. If no other local store has the item in stock, the shipment is handled through the normal fulfillment processes of the virtual store.

U.S. Pat. No. 7,844,481 discloses system and methods for shipping a package from a package sender to an intended recipient, utilizing Internet communications to place shipping orders, request on-demand package pickup, maintain and utilize pre-stored profile information, view shipping history, track orders, etc. A package sender with an Internet-accessible computer accesses an Internet site and associated shipping system operated by a shipping service provider. The package sender enters information required for shipping the package, including shipping options and methods for payment. The options and payment for the shipment transaction are validated. If the transaction is validated, printer indicia are communicated to the customer's computer, which is enabled to locally print a prepaid label containing special machine-readable as well as human-readable indicia. The shipping service provider acquires the package by drop-off, standard pickup or on-call pickup, scans the machine readable indicia, verifies other indicia of authenticity, and processes the package in accordance with information encoded on the label.

U.S. Publication No. 2004/0030572 discloses a method and system for performing routed deliveries in a highly efficient manner enables both senders and recipients, as appropriate, to monitor relevant delivery routes and track the delivery progress in real time, access delivery summary reports, and manage invoices. Using the system, a same-day on-demand delivery order may be placed by phone or through a web site. A dispatch processor determines a branch server to handle the delivery order and transmits the order to the branch server. If an acknowledgment of the order is not received within a designated amount of time, an alarm is sounded. Upon receipt of the order at the branch server, a dispatch server assigns the delivery order to a driver to perform the delivery. The system also manages operation of same-day large-scale routed deliveries. For routed deliveries, couriers are assigned delivery routes which enable optimized efficiency in performing the routed delivery order in that the delivery stops are automatically placed in the most efficient sequence using a pre-designed, optimized route (e.g. destination address of each stop, travel directions to each stop from the previous stop). For each type of delivery, the courier provides delivery status information status in real time to a branch server as each delivery is made, which enables customers and recipients to track parcel delivery and monitor routes in real time through a web site.

U.S. Publication No. 2002/0152128 discloses a system and method of delivering remotely ordered consumer items including recording a current purchase order of the consumer; scanning a unique product code for entering onto the current purchase order data identifying at least one item; selecting at least one item for the current purchase order from an Internet web page; aggregating one or more items on the current purchase order from at least one merchandiser within a local area; bundling the aggregation of items with at least one item received from beyond the local area; and/or retaining the items at an errand center storefront for retrieval by the consumer or any combination thereof.

U.S. Pat. No. 5,960,411 is representative of what is in the art.

Amazon.com offers same-day delivery for certain items which are delivered to certain addresses http://www.amazon.com/gp/help/customer/display.html?nodeId=200105970).

1800Flowers offers same-day delivery service for many items. To view the available items, one first puts in the date they wish the items to be delivered, the zip code of the person to whom they are to be delivered, and the type of location to which they will be delivered. The website provides the following statement after such information is entered: "For same-day flower deliveries, order by 2:00 p.m. Monday to Friday, 12:30 p.m. Saturday, or 11:30 a.m. Sunday in your recipient's time zone. Your flowers will be hand-delivered that same day! Choose from our collection of beautiful flower arrangements, plants, gift baskets, balloons, or our other signature items." The website can be seen at: http://ww31.1800flowers.com/.

Barnes & Noble offers same-day delivery for certain items in Manhattan, N.Y. As stated on the web site, as long as the order is placed by 11:00 a.m., and the item is one which is available for same day delivery, then the item will be delivered by 7:00 p.m. The webpage can be seen at: http://www.barnesandnoble.com/help/cds2.asp?pid=23252.

LivingSpaces Furniture provides same-day delivery for items ordered by 4:00 p.m. Items can be ordered online. The website can be seen at: http://www.livingspaces.com/Store-Policies.aspx The following U.S. Patents Applications are incorporated herein by reference:

U.S. Provisional Patent Application Ser. No. 61/634,808, filed 7 Mar. 2012; and

U.S. Provisional Patent Application Ser. No. 61/634,523, filed 2 Mar. 2012.

The following U.S. Trademark registrations are incorporated herein by reference:

U.S. Trademark Registration No. 2005733, registered on 8 Oct. 1996, cancelled on 12 Jul. 2003; U.S. Trademark Registration No. 3724107, registered on 15 Dec. 2009; and, U.S. Trademark Registration No. 3930345, registered on 15 Mar. 2011.

BRIEF SUMMARY OF THE INVENTION

The present invention is a Barcode to Zipcode Application. The purpose of this application is to remove as many steps from the supply chain as possible, reducing the time required to complete the process of purchasing goods in one location for delivery in another location to hours or even minutes. This application contains interfaces to location based retail product information services as well as customer payment processing systems. The application functions as an internet web application with the primary users being the customer service representatives and delivery personnel.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 14 is a screenshot of the screen that allows a user to search for existing sending customers for a preferred embodiment of the application;

FIG. 15 is a screenshot of the sending customer demographic screen for a preferred embodiment of the application;

FIG. 16 is a screenshot of the screen that allows a user to search for existing receiving customers for a preferred embodiment of the application;

FIG. 17 is a screenshot of the receiving customer demographic screen for a preferred embodiment of the application;

FIG. 19 is a screen shot of the product search screen for a preferred embodiment of the application, that allows the user to search for products identified by barcode at the location identified by zipcode;

FIG. 23 is a screenshot of the payment screen for a preferred embodiment of the application;

FIG. 25 is a screenshot of the order summary screen for a preferred embodiment of the application; and, FIG. 26 is a screenshot of the order detail screen for a preferred embodiment of the application.

DETAILED DESCRIPTION OF THE INVENTION

Figure 1:
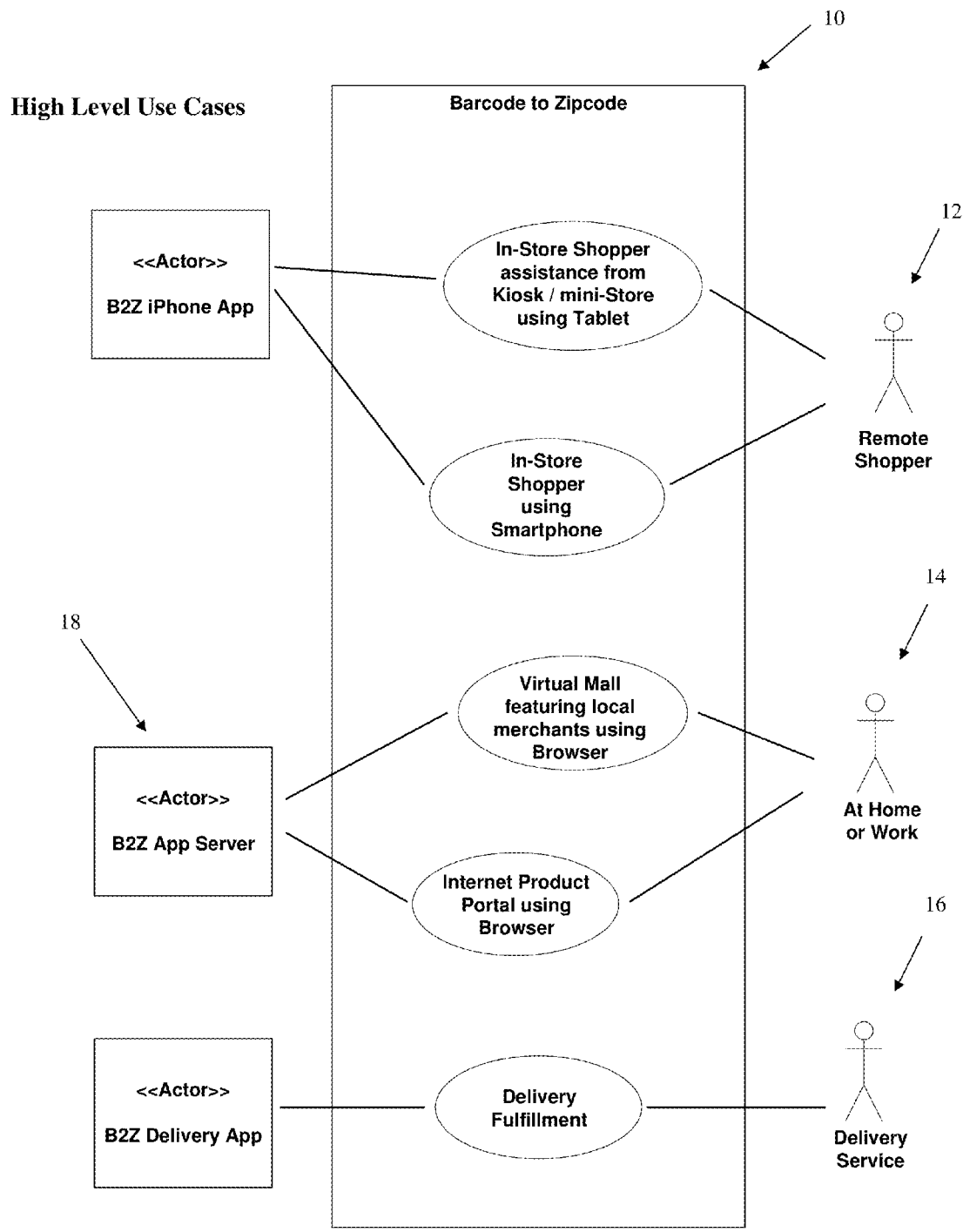
FIG. 1 is a schematic of high level use cases for the preferred embodiment of the application of the present invention.
Figure 2:
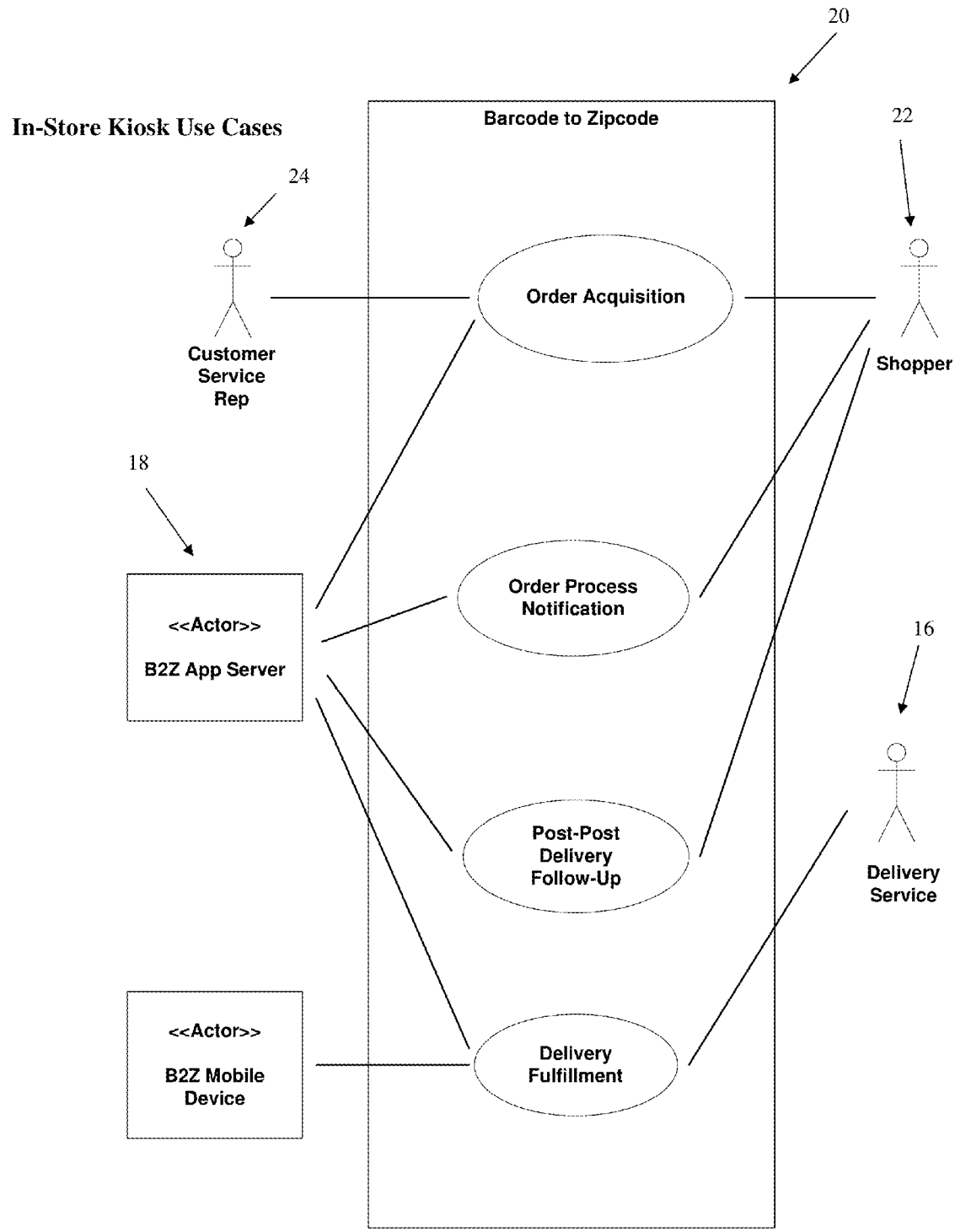
FIG. 2 is a schematic of in-store kiosk use cases for the preferred embodiment of the application of the present invention.
Figure 3:
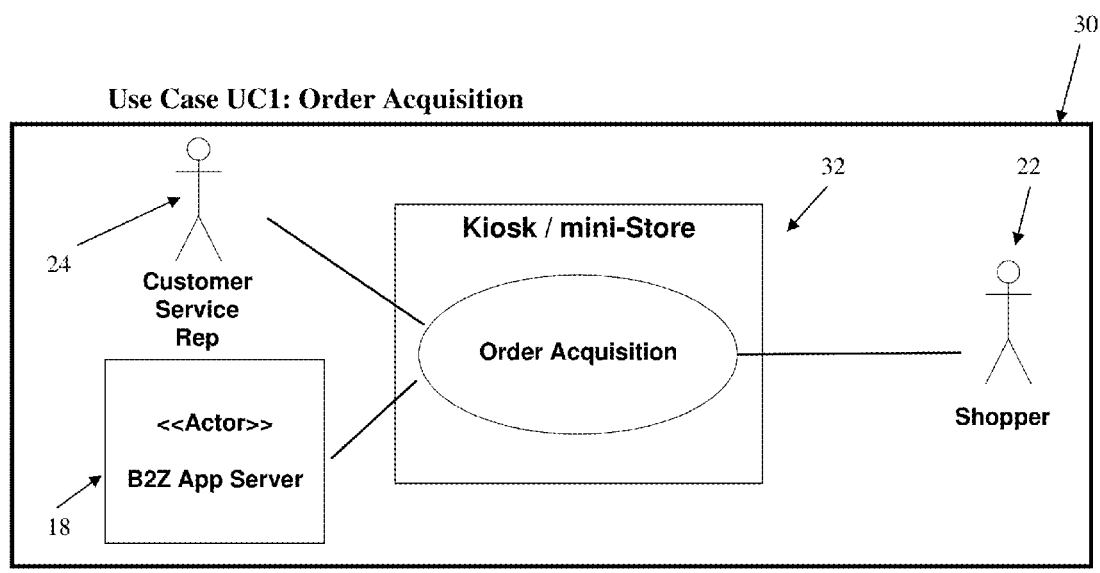
FIG. 3 is a schematic for order acquisition using a kiosk or mini-store for the preferred embodiment of the application of the present invention.
Figure 4:
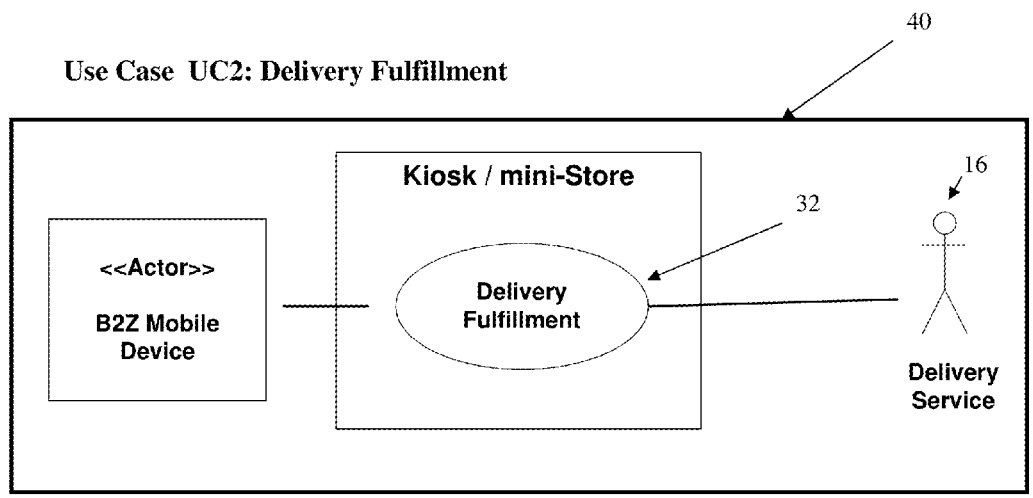
FIG. 4 is a schematic for delivery fulfillment using a kiosk or mini-store for the preferred embodiment of the application of the present invention.

The Barcode to Zipcode Application is intended to provide a seller of goods, for example a corporate entity, with a method for the location based identification of products, the acquisition of orders for those products, and the ultimate delivery of those products to the intended recipient. During the process, status updates can be communicated to the interested parties as to the progress of the transaction as it speeds along the supply chain. Purchaser payment processing is also supported thru interaction with commercial payment processing businesses.

The Barcode to Zipcode Application is the first of a new class of internet applications in the vertical software space of the retail product delivery. It is developed using an n-tier software architecture, using several layers of software functionality to provide for a flexible, extensible design. It is designed to fit seamlessly into the generally accepted standard operational procedures used within retail entities to initiate, track, and fulfill product orders intended for remote delivery without the actual transportation of the items between the interested sender and the intended receiver.

The Barcode to Zipcode Application makes use of common components, including browsers, web servers, relational databases, existing network infrastructure and common telecommunications technologies to achieve full functionality. The Barcode to Zipcode Application provides the following features:

Provides interested shoppers with the ability to identify, purchase, virtually ship, and have delivered products from and between retail locations.

Provides Customer Service Representatives 24 with the technology and information to acquire product orders, virtually ship, and facilitate delivery of retail products from anywhere and to anywhere in the country.

Allows the corporate entity to track shipments, process payments and acquire delivery statistics of orders processed by the Application.

Facilitates a source to destination supply chain that can remarkably decrease delivery time and costs by eliminating the infrastructure required to transport products over great distances in a short amount of time.

The Barcode to Zipcode Application may have the following users:

A Customer Service Representative 24 who maintains a presence within the retail organization, acquires product orders from interested shoppers 22, and initiates the supply chain to have the order delivered to the intended recipient;

An interested shopper 12, 14, 22 who acquires products from a retail establishment and intends to have the products delivered to an intended recipient; An intended recipient who receives the order after it has been virtually shipped and delivered by the fulfillment representative 16; and, A fulfillment representative 16, such as a delivery service, who retrieves the order from the remote retail location, transports the order to the intended recipient and delivers the order.

The Barcode to Zipcode Application will make use of:
- a primary user interface (UI), preferably Microsoft Explorer.
- a web server 34, preferably Oracle MySQL Server running on a dedicated Server
- an application server 18, preferably JBoss Application Server, running on a dedicated Server.
- All of these servers are be accessible via a high speed local area network. They are rack mounted within an operation center located in an Information Systems data center.
- All retail messaging uses a markup language, such as XML (extensible markup language), that allows documents to be formatted in a way that is readable by both users and machines. Communications via TCP/IP use standard HTTP communications protocols. Browser interaction is managed via the application server.

The Barcode to Zipcode Application will provide for the following types of system documentation:
- On-line user interface documentation will be provided, for example by context sensitive help windows, documentation indexes, and/or other types of UI documentation.
- Off-line documentation will be delivered to the user via document files, printed material, video, or other means of off-line delivery. This documentation may include User guides, Technical implementation, Extensibility documentation, and other documentation. The documentation is preferably in PDF format, but may also be in Word format.

Location based product information will be acquired thru a service provider of product information 36, preferably Retailigence.

User interfaces to the Barcode to Zipcode Application include human interaction mechanisms such as screen, keyboard, and mouse data entry devices. The primary function of these interfaces is to gather the information to make the Application functional. Data entry and configuration interfaces are intended to allow for:
- location based identification of products
- acquisition of orders for those products
- location of the products in the intended location
- delivery of those products to the intended recipient Hardware interfaces within the Barcode to Zipcode Application consist of:
- Human interaction components (ie. Screens, keyboards, mice)
- Network connection components
- Application and database servers
- Wireless devices used in the delivery fulfillment process Software interfaces include those between the Barcode to Zipcode Application and external systems. A preferred embodiment includes interfaces to the following:
- Database: MySQL
- Message Server: JBoss AS 7
- Wireless environment: iOS6

The Barcode to Zipcode Application will communicate with the external systems via a variety of communications protocols. A preferred embodiment uses the following:
- Database: The Application will use JPA to communicate with MySQL Server
- Message Server: Communication with the message server will be via TCP/IP HTTP
- Retailigence—The interaction with the Retailigence Service will be via RESTfull Web Services The Barcode to Zipcode Application is being designed as a layered application. It makes use of four primary layers:

1. Presentation Layer

This layer of the application contains the User Interface to the application. The various aspects of user interaction are handled in this layer of the application. This layer is not responsible for the execution of business logic, rather it communicates downward to the business layer.

2. Business Layer

This layer contains the applications business logic. Rules associated with how the business objects are processed and why they are processed are incorporated within this layer. This layer returns information to the Presentation Layer and obtains resources from the Service Layer.

3. Service Layer

This layer contains the application services as well as the code to instantiate those services. The heavy lifting of the application takes place within this layer of the application. It returns information to the Business Layer and obtains resources from the Data Layer of the application 4. Data Layer This layer contains the logic to interact with the persistence mechanisms of the application. The application will interact with the database. The data layer is used to abstract the access of the data source from the rest of the application.

Figure 5:
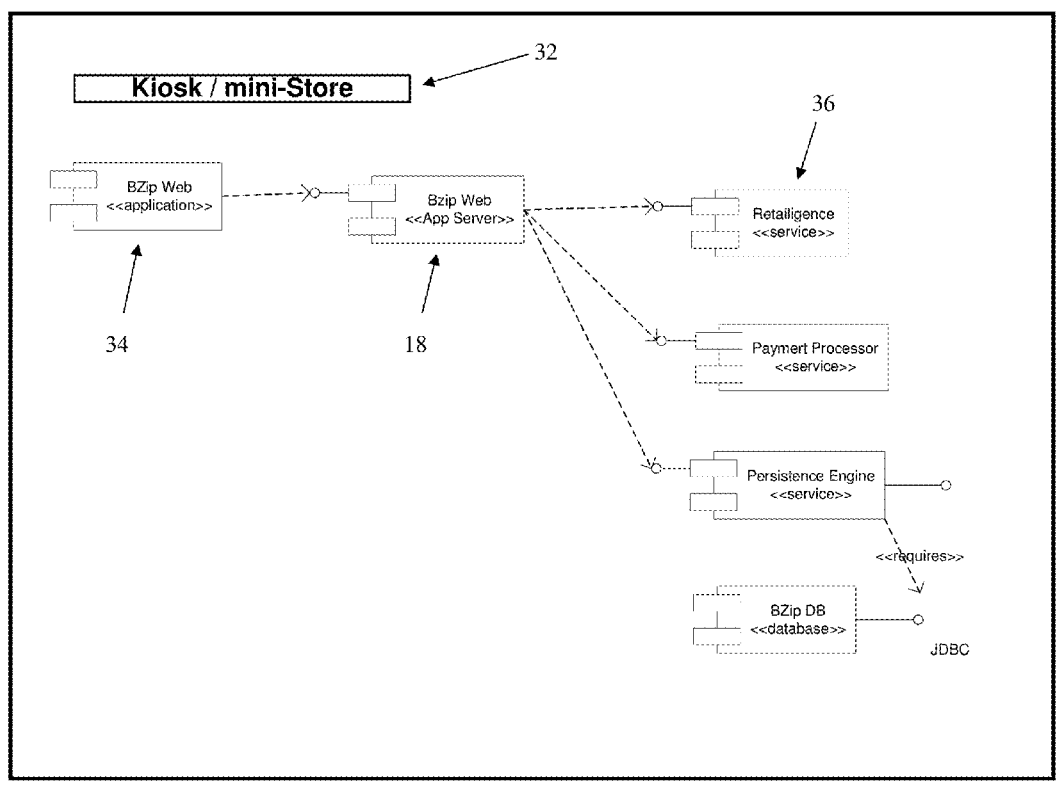
FIG. 5 is a component diagram of the preferred embodiment of the application of the present invention.
Figure 6:
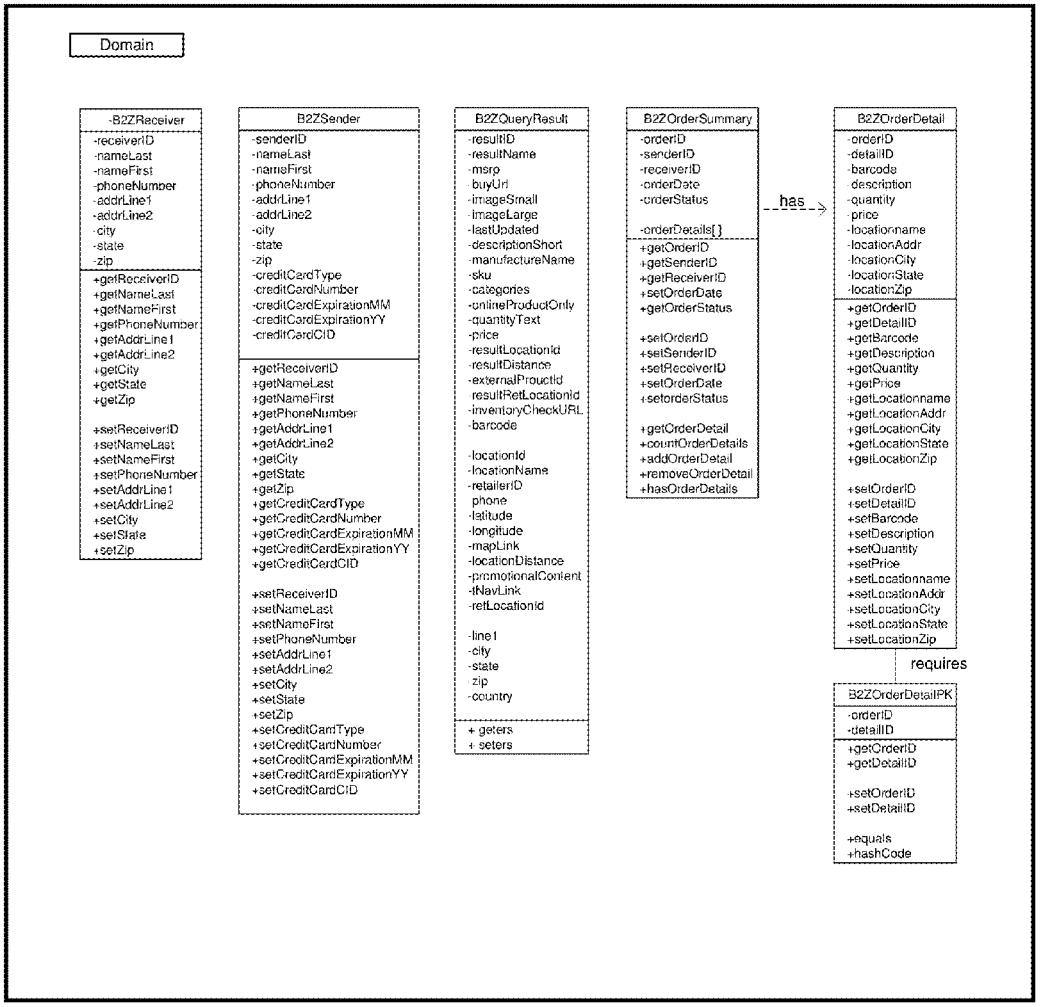
FIG. 6 is a data layer diagram of the preferred embodiment of the application of the present invention.

There are several diagrams that describe these various layers within the application. FIG. 5, the Component Diagram, describes the existence of the various components that make up the Barcode to Zipcode Application as well as their relationships.

The Service layer of the Barcode to Zipcode Application serves to abstract the communication with various external entities away from the business layer of the application. There are several external entities that this application interacts with in order to achieve full functionality. These external entities include an external database management system, such as MySQL Server. The interaction with the database serves to persist the information gathered by the application for use elsewhere in the application. Activities such as saving shoppers, receivers, orders, notifications, are all managed through the database implementation.

FIGS. 1-4 are diagrams including the services layers for the top two Use Case Scenarios for the Barcode to Zipcode Application, Order Acquisition, and Delivery Fulfillment. These Use Cases constitute the bulk of the functionality of the application.

The Barcode to Zipcode Application employs web browser based user interaction methodologies. Within the context of the thin-client/server architecture, a model-view-controller (MVC) design pattern is employed combined with a Front Controller request handler. This combination of MVC using a Front Controller allows for maximum flexibility in application deployment while maintaining a high degree of management of the process flow and user interaction.

Figure 7:
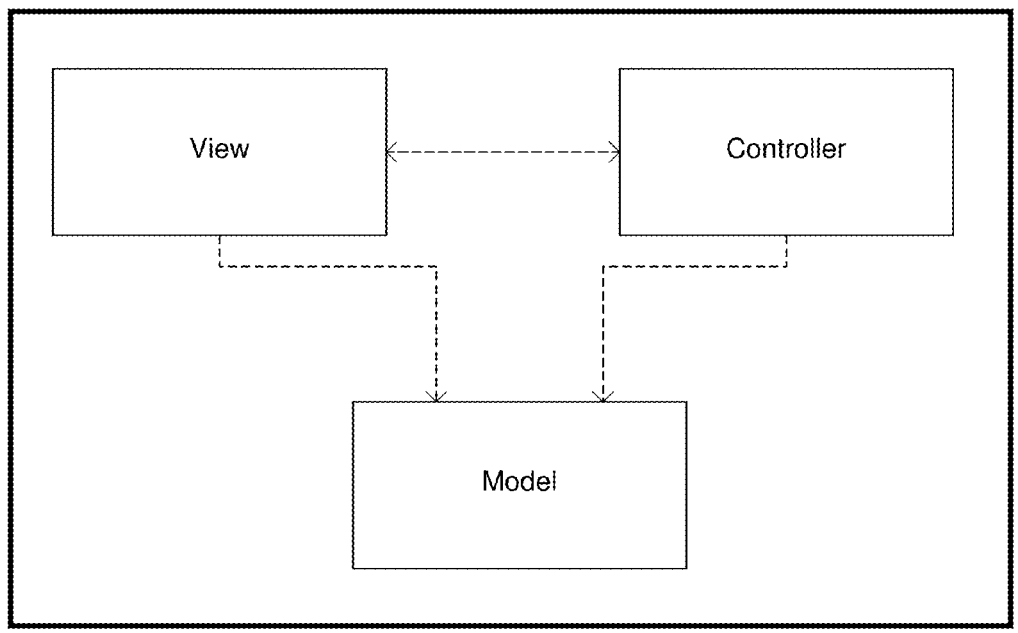
FIG. 7 is the Model-View-Controller pattern of the preferred embodiment of the present invention.

The model-view-controller pattern, depicted in FIG. 7, can be broken into three distinct parts. These parts consist of:
1. The Input Controller. First, the initial web request and all follow-on requests are handled by an input controller. This input-controller is responsible for the initial inspection of the URL as well as any decision making that takes place as a result of the URL and screen content. The Input Controller is then responsible for passing control to the appropriate Model.
2. The Model. This is the portion of the presentation layer that looks inward to the business layer of the application. The model makes processing requests of the business layer and receives the results of those requests. After receiving the result of the business layer processing, the Model then prepares the data to be handed off to the View portion of the presentation layer.
3. The View transforms the data stream handed to it by the Model into a form that is presented to the user through the Web Browser. The view should not process any data, and should not be aware of any requests made to any lower level of the N-Tier Architecture. Following the presentation to the user, processing control is then delegated to the Input Controller.

Figure 8:
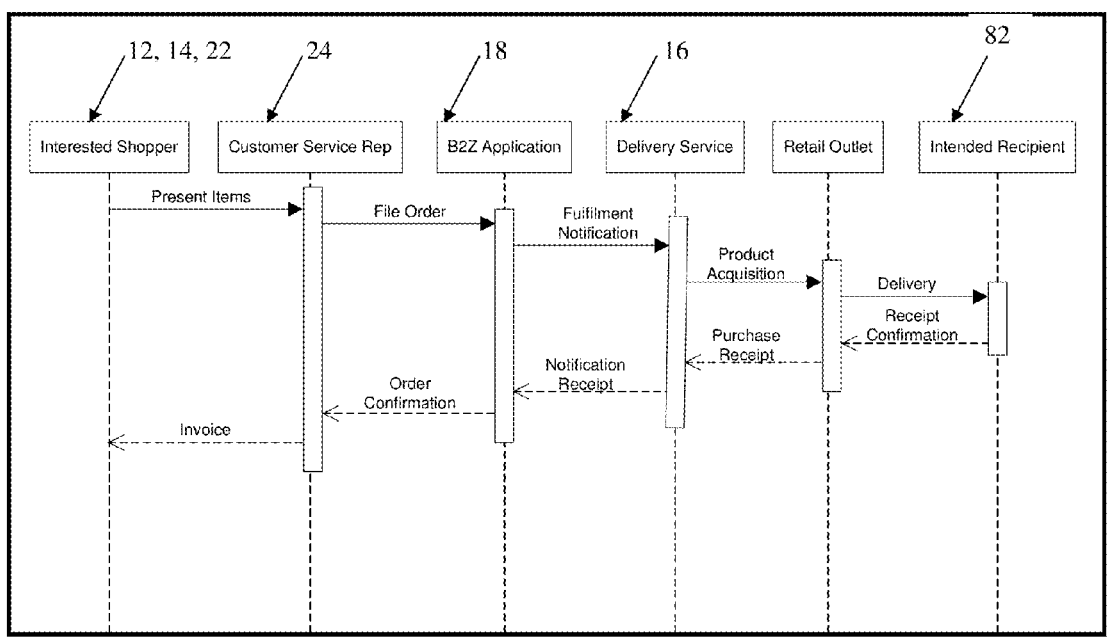
FIG. 8 is a sequence diagram for order and delivery for the preferred embodiment of the application of the present invention.
Figure 9:
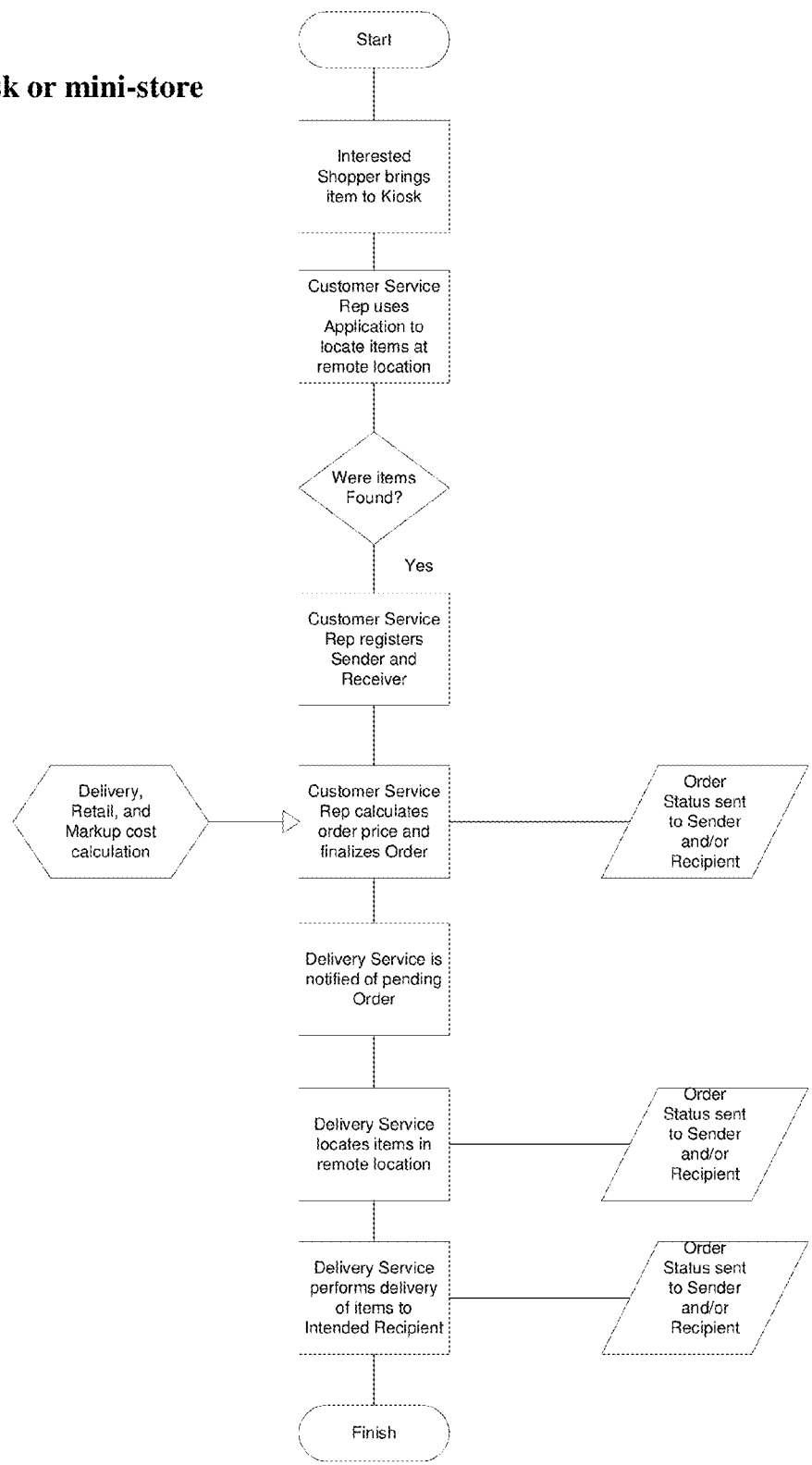
FIG. 9 is a flowchart of the application of the present invention using an in-store kiosk or mini-store.
Figure 10:
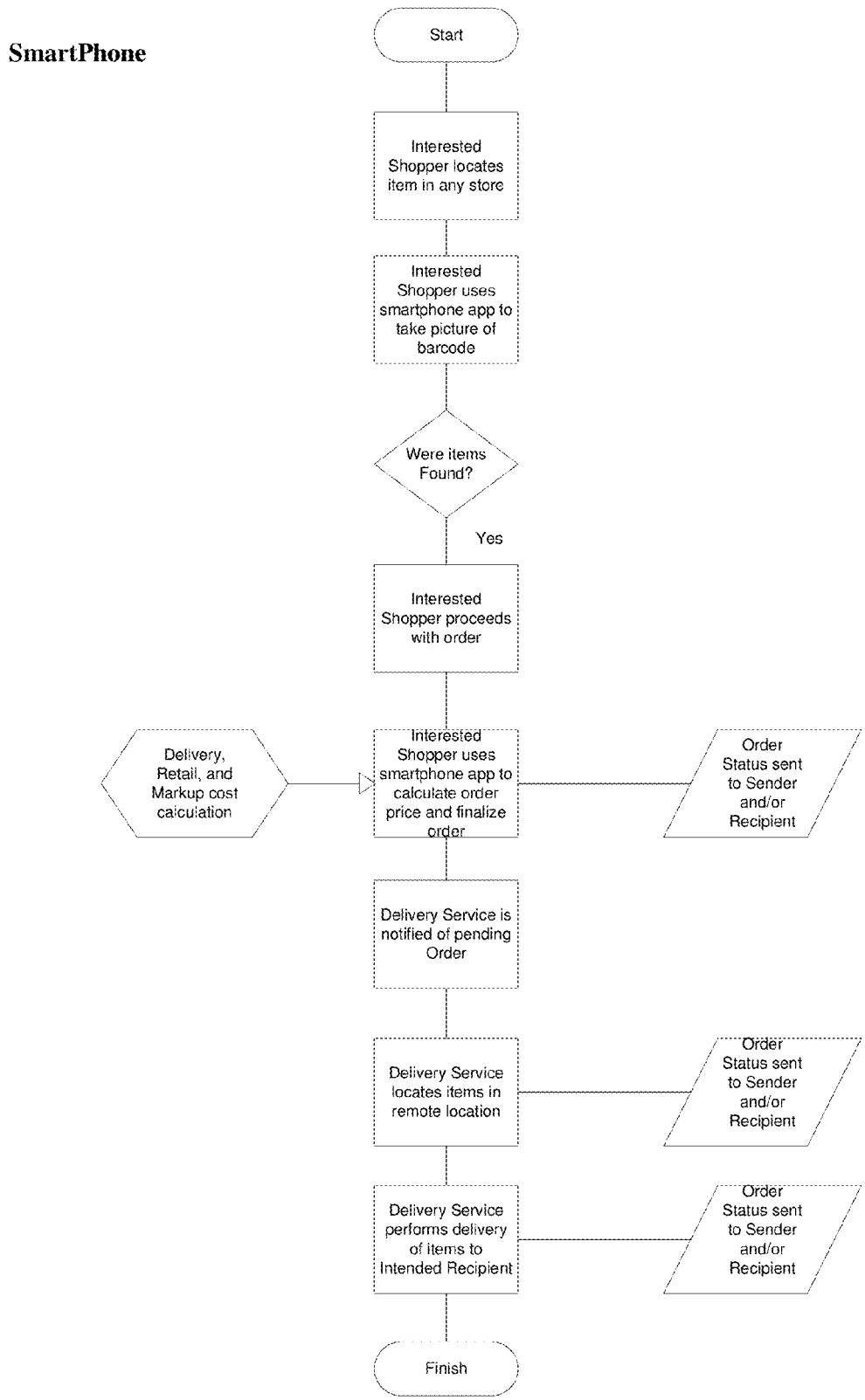
FIG. 10 is a flowchart of the application of the present invention using a smartphone.
Figure 11:
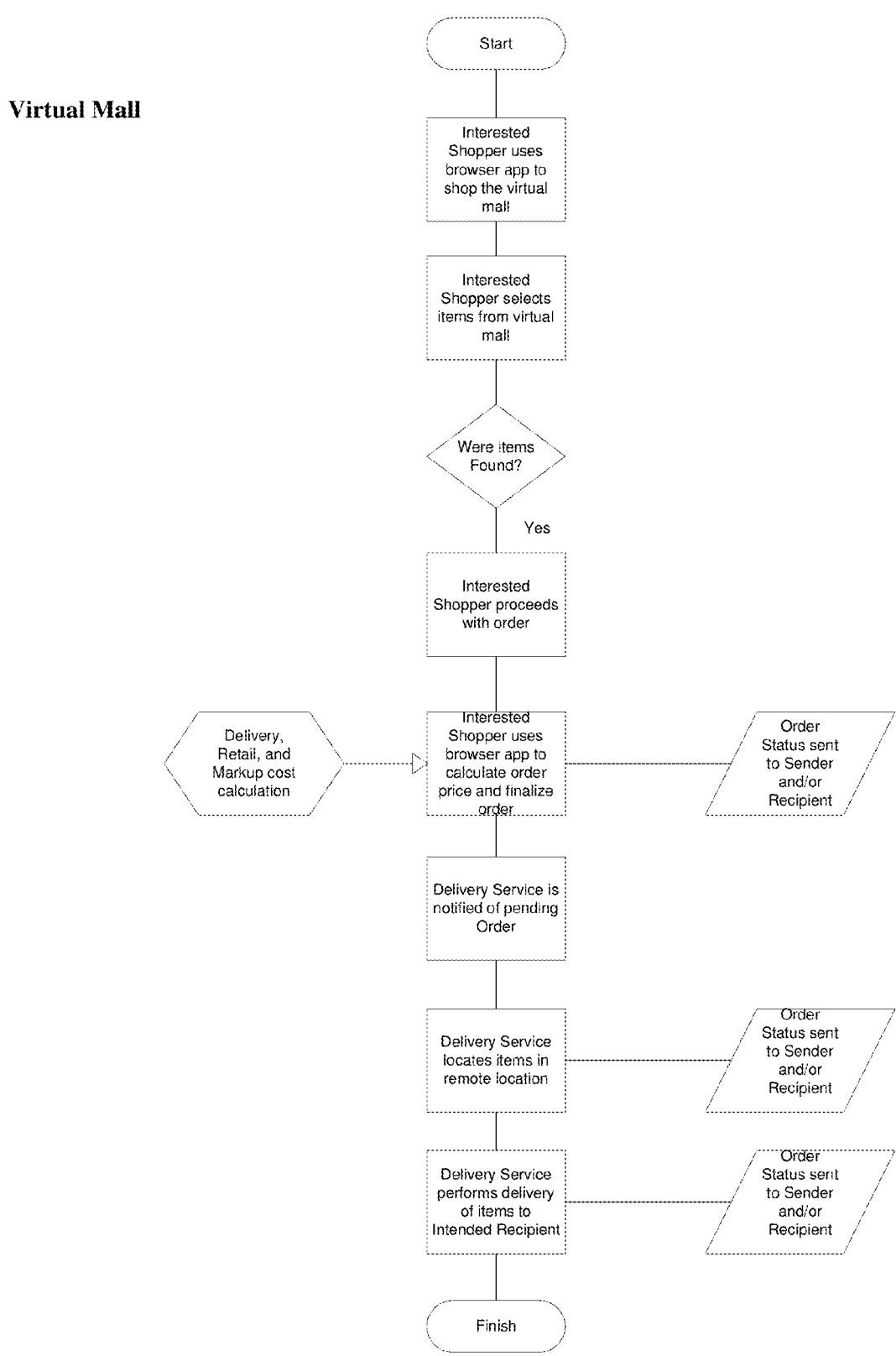
FIG. 11 is a flowchart of the application of the present invention using a virtual mall.
Figure 12:
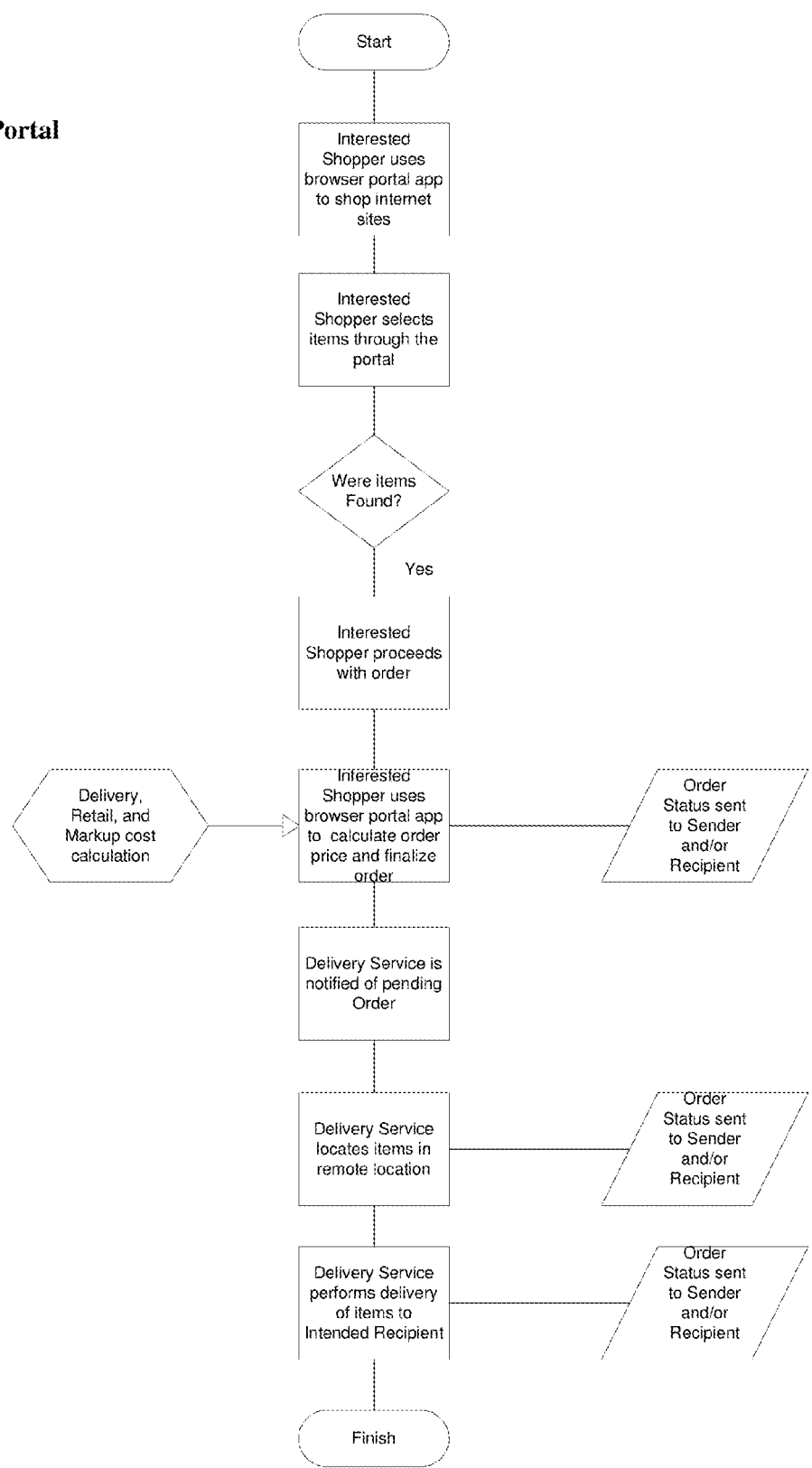
FIG. 12 is a flowchart of the application of the present invention using an internet portal.

FIG. 8 is a sequence diagram representing the natural flow of control through the application lifecycle as the user interacts with the presentation layer, and therefore initiates activities throughout the application.

FIGS. 9-12 are flowchart diagrams representing the natural flow of control through the application lifecycle as the Interested Shopper 12, 14, 22 interacts with the seller of goods.

FIGS. 13-25 are screenshots of various user interface screens seen during use of the preferred embodiment of the application of the present invention.

Example 1—General Order Processing by Customer Service Representative for Interested Shopper A Customer Service Representative 24 wants to assist an interested shopper 12, 14, 22 in the successful location of the products in an area near the intended receiver 82. Following the identification of the products near the intended receiver 82, the customer service representative 24 will conclude the transaction by processing the payment for the goods and services thru the Application.

The Interested Shopper 12, 14, 22 wants to quickly and easily process a virtual shipping request from the current location to the Intended Recipient 82, and to conclude the transaction with the expectation that status of the supply chain process will be effectively communicated throughout the process.

Precondition: The Interested Shopper 12, 14, 22 has selected one or more items to have virtually shipped to an Intended Recipient 82.

Success Guarantee: The order is processed, the items are acquired in the remote location and the delivery is fulfilled to the Intended Recipient 82. The status of the order is effectively communicated to the Interested Shopper 12, 14, 22.

Main Success Scenario:

The Customer Service Representative 24 registers the Interested Shopper 12, 14, 22 and the Intended Recipient 82.

The Customer Service Representative 24 uses the Application to search for, and locate the items in the remote location.

The Customer Service Representative 24 concludes the transaction by processing the payment for the goods and services.

Example 2—General Order Fulfillment by a Delivery Service

A fulfillment representative 16, in this example a Delivery Service, wants to retrieve an order identifying each and every location to visit to acquire the items as part of the virtual shipment, purchase the items, and deliver the order to the Intended Recipient 82.

The Intended Recipient 82 wants to receive the order delivered in a timely fashion, by a courteous Delivery Service representative.

The Interested Shopper 12, 14, 22 wants to be notified of the status of the order as it is makes its way through the fulfillment process.

Precondition: The order has been properly placed, the information about the products in the virtual shipment is timely and accurate.

Success Guarantee: The shipment is delivered to the Intended Recipient 82.

Main Success Scenario:

The Delivery Service is notified of a pending order for delivery.

The Delivery Service is able to locate and purchase the items as specified in the order The Delivery Service is able to deliver the shipment to the Intended Recipient 82 in a timely fashion.

The Interested Shopper 12, 14, 22 is notified of the delivery.

Example 3—Using Prototype with Screenshots

Figure 13:
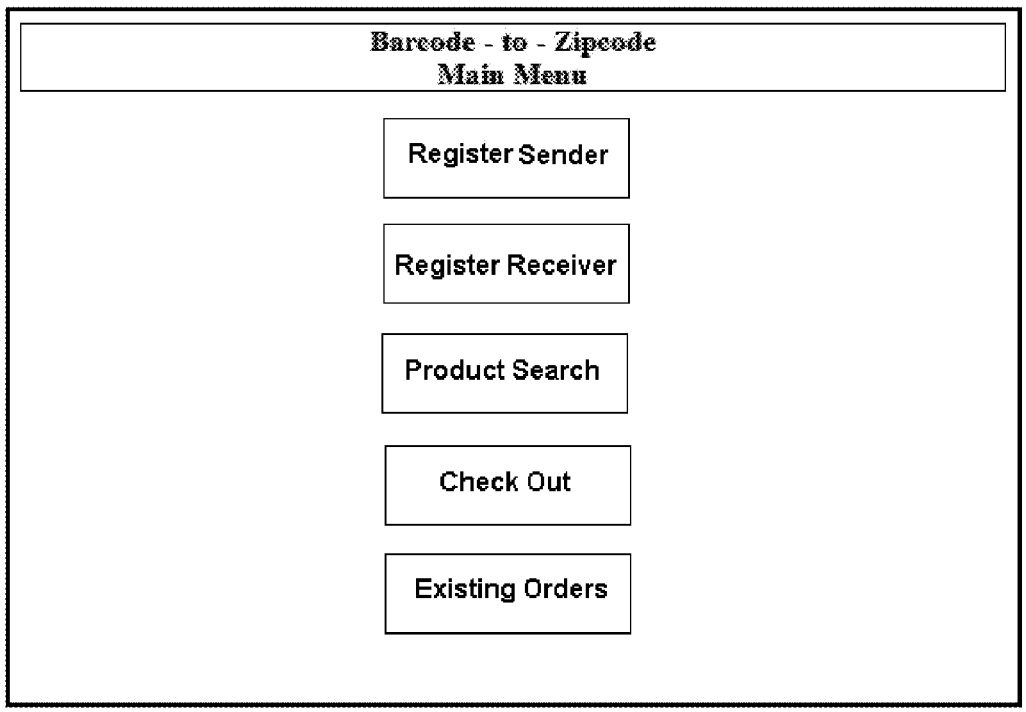
FIG. 13 is a screenshot of the main menu screen for a preferred embodiment of the application.

FIG. 13 shows the Main Menu screen of the preferred embodiment of the application of the present invention. The Main Menu is the primary entry point of the application. From here, the user can navigate to any of the functional sections of the application, including sender registration, receiver registration, product search, check out, and existing order review. After completing each of the application steps, the user is taken back to the Main Menu screen, which is updated to reflect the steps completed. For example, after a sender is registered and selected, the Main Menu screen will show the sender's information next to the "Register Sender" icon (see, for example, FIG. 18).

From the Main Menu screen, the user selects "Register Sender" icon and is taken to the sender search screen (FIG. 14). The user searches for the sender by name. If the sender is not found, the user can click on the "New" icon to be take to the register new sender screen (FIG. 15). Once a sender has been registered once, they need not be re-entered if they wish to send again; their information will be saved and can be pulled up from the search screen (FIG. 14).

Figure 18:
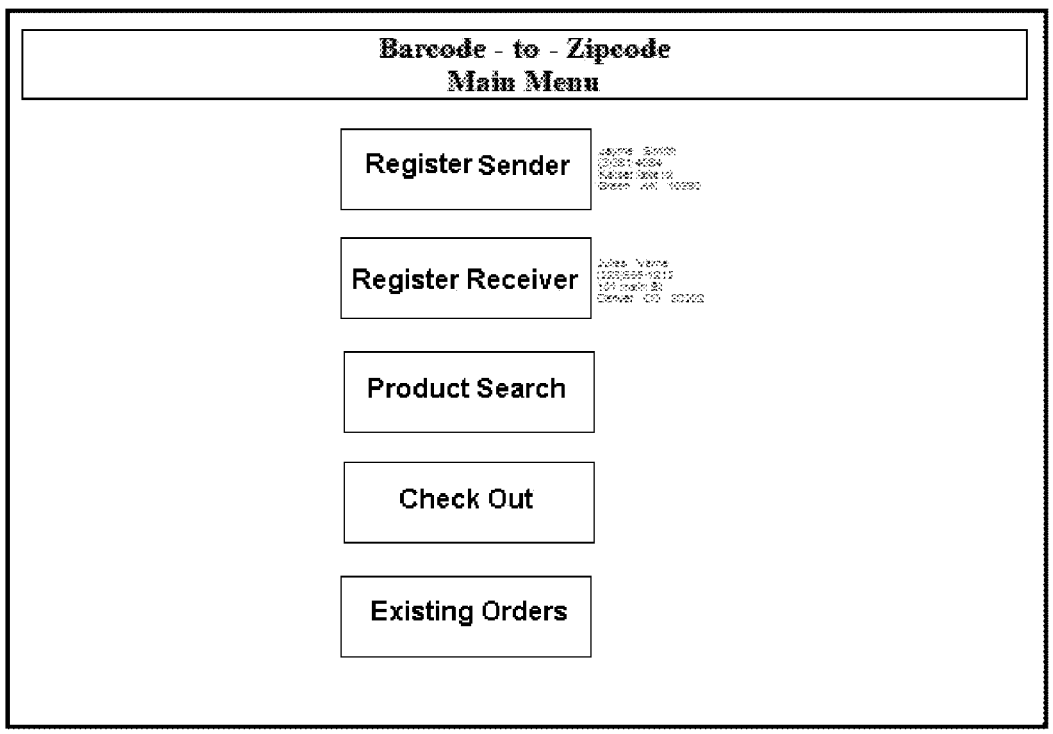
FIG. 18 is a screenshot of the main menu screen after the sending and receiving customers have been identified for a preferred embodiment of the application.
Figure 20:
FIG. 20 is a screenshot of the product detail screen of a preferred embodiment of the application.
Figure 21:
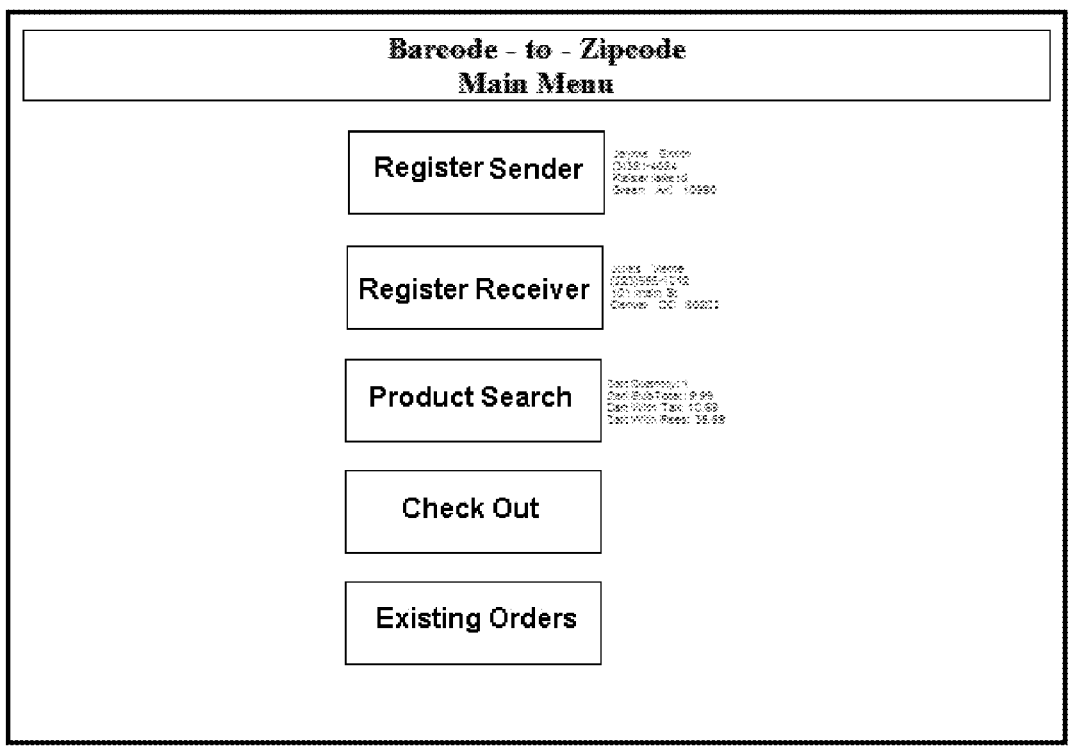
FIG. 21 is a screenshot of the main menu after the product or products have been selected of a preferred embodiment of the application.

After the sender is registered, the user is returned to the Main Menu where they can click on the "Register Receiver" icon. The receiver is registered in the same way the sender was registered (FIGS. 16-17). Then the user is again returned to the Main Menu where the sender and receiver information is displayed next to the corresponding icons (FIG. 18).

From here, the user can click on the "Product Search" icon to be taken to the product search screen (FIG. 19). The user enters the desired product barcode. The barcode may be entered by a barcode scanner, a keyboard, or some other means of data entry. The user then enters the zipcode for the desired location. The application locates the desired product in or near the desired location. The user then chooses the product and location the wish to purchase and is taken to the Product Details page.

On the Product Details page (FIG. 20), the user can confirm the selected product and enter a quantity to be purchased. The user is then taken back to the Main Menu where the product detail is now shown next to the Product Search icon (see FIG. 21).

Figure 22:
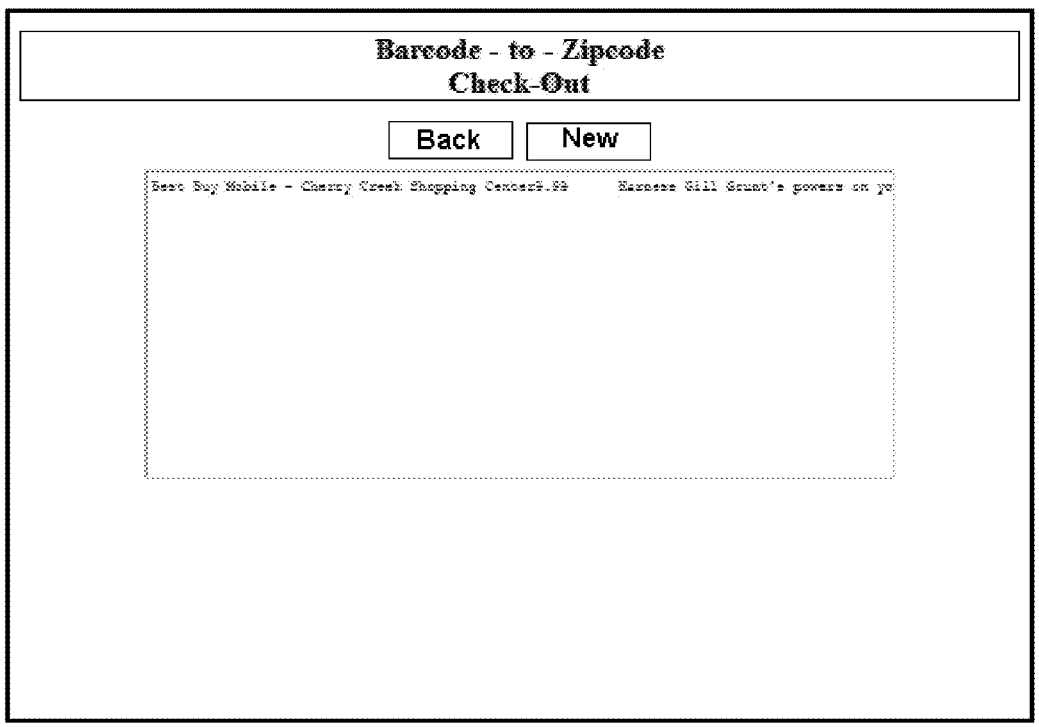
FIG. 22 is a screenshot of the check-out screen for a preferred embodiment of the application.
Figure 24:
FIG. 24 is a screenshot of the order confirmation screen for a preferred embodiment of the application.

Once the user is done choosing products, they can click on the Check Out icon to be brought to the Check Out screen (FIG. 22). Products can be removed prior to completing the order from the Check Out screen.

After confirming their order on the Check Out screen, the user clicks on the "Next" icon to be taken to the Payment Method screen (FIG. 23). Here the user enters the payment information. In this example, the sender is paying by credit card; however, the application of the present invention supports other payment methods, including PayPal.

Once payment information is processed, the user is taken to the Order Confirmation screen (FIG. 24) where their order is displayed. The user can also view existing orders by clicking on the Existing Orders icon from the Main Menu screen. This brings them to the Order Summary List (FIG. 25). Clicking on one of the orders on the Order Summary List will bring the user to the Order Detail screen for that order (FIG. 26). The Order Detail screen will show information including the receiver, sender, payment, and products.

Preferably, inside a retail store at the mini kiosk postal store side of operations (near a computer on which one operates the software of the present invention—this computer could be part of the kiosk) one could also transmit visual pictures including motion picture images using modern telecommunication devices such as: video cameras, digital cameras, cell phone cameras, laptop cameras, desktop cameras, IPads, IPod cameras, web cams, fax, electronic transmission, etc., all either connected with the mini kiosk or separated or any combination of both methods using modern telecommunications systems; this system could be used as a backup, giving other ways to identify merchandise to be pulled from the shelf at the retail store in the zip code delivery destination of the receiver.

The following is a list of definitions, conventions, and acronyms used within this document.

Administrator—A login ID representing a user with administration rights within the Barcode to Zipcode Application User—shopper, customer service representative, or fulfillment representative.

Use Case—A diagram describing who can do what with the system

Component Diagram—A diagram describing how the different components relate

Domain Layer—A diagram describing the classes that interact with the physical data elements

PARTS LIST

The following is a list of parts and materials suitable for use in the present invention:

PARTS NUMBER DESCRIPTION 10 high level use schematic of the preferred embodiment of the present invention
12 remote shopper
14 at-home shopper
16 fulfillment representative
18 application server
20 in-store kiosk use schematic of the preferred embodiment of the present invention
22 in-store shopper
24 customer service representative
30 schematic of order acquisition using a kiosk or mini-store
32 kiosk or mini-store
34 web application
36 product information service
40 schematic of delivery fulfillment using a kiosk or mini-store
82 intended recipient All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A system for providing services for a user to purchase products in one location for delivery in another location, the system comprising:
   an in-store kiosk;
   a web server operating on a first dedicated server;
   an application server operating on a second dedicated server;
   a database server; and,
   a layered software application comprising the following layers:
   a) a presentation layer configured to generate a user interface, the presentation layer operated on the kiosk;
   b) a business layer configured to process and track product orders, process product payments, and acquire delivery statistics using a business logic, the business layer returning information to the presentation layer, the business layer operated on the web server;
   c) a service layer configured to execute application services, including:

(i) location-based identification of products,
(ii) acquisition of orders for those products,
(iii) location of products in the intended location, and
(iv) delivery of those products to the intended location;
wherein the service layer is configured to transmit information to the business layer, and the service layer is operated on the application server; and,
d) a data layer configured to interact with a database and to provide information and resources to the service layer, the data layer operated on the database server.

2. The system of claim 1, wherein the presentation layer employs a web browser based user interaction methodologies.

3. The system of claim 2, wherein the dedicated servers are rack mounted within an operation center located in an information systems data center, and are accessible via a high speed local area network.

4. The system of claim 1, wherein the user interface provides documentation to a user via messaging, the messaging using a markup language that allows the documentation to be formatted in a way that is readable by both the user and the application.

5. The system of claim 1, wherein the user interface is configured to receive input from at least one of the following human interaction mechanisms for data entry: monitor, keyboard, or mouse.

6. The system of claim 1, wherein the location based identification of products is acquired through a service provider of product information.

7. The system of claim 1, wherein the kiosk is configured to receive a selection of goods, and the goods are delivered to a recipient form a different store of the retailer.

8. The system of claim 7, wherein the goods are to be delivered to the recipient by an employee of the retailer.

9. The system of claim 7, wherein the goods are to be delivered to the recipient by a delivery service.

* * * * *